(12) United States Patent
De Zwart et al.

(10) Patent No.: US 8,134,590 B2
(45) Date of Patent: Mar. 13, 2012

(54) STEREOSCOPIC DISPLAY APPARATUS

(75) Inventors: Siebe T. De Zwart, Valdenswaard (NL); Willem L. Ijzerman, Eindhoven (NL); Tim Dekker, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 1170 days.

(21) Appl. No.: 11/912,440

(22) PCT Filed: Apr. 20, 2006

(86) PCT No.: PCT/IB2006/051227
§ 371 (c)(1),
(2), (4) Date: Oct. 24, 2007

(87) PCT Pub. No.: WO2006/117707
PCT Pub. Date: Nov. 9, 2006

(65) Prior Publication Data
US 2008/0204550 A1    Aug. 28, 2008

(30) Foreign Application Priority Data

Apr. 29, 2005  (EP) .................................. 05103555

(51) Int. Cl.
*H04N 13/04* (2006.01)

(52) U.S. Cl. ............................................ 348/51; 348/42
(58) Field of Classification Search .................... 348/42, 348/51
See application file for complete search history.

(56) References Cited

U.S. PATENT DOCUMENTS

| | | | | |
|---|---|---|---|---|
| 5,953,148 A * | 9/1999 | Moseley et al. | | 359/237 |
| 6,064,424 A * | 5/2000 | van Berkel et al. | | 348/51 |
| 6,801,243 B1 * | 10/2004 | Van Berkel | | 348/59 |
| 7,671,889 B2 * | 3/2010 | Lipton et al. | | 348/51 |
| 7,961,196 B2 * | 6/2011 | Riemens et al. | | 345/581 |
| 2001/0050686 A1 * | 12/2001 | Allen | | 345/543 |
| 2002/0126202 A1 * | 9/2002 | Wood et al. | | 348/59 |
| 2005/0012814 A1 * | 1/2005 | Shen | | 348/51 |
| 2006/0119597 A1 * | 6/2006 | Oshino | | 345/418 |
| 2009/0115800 A1 * | 5/2009 | Berretty et al. | | 345/690 |
| 2010/0328440 A1 * | 12/2010 | Willemsen | | 348/59 |

* cited by examiner

*Primary Examiner* — Faruk Hamza
(74) *Attorney, Agent, or Firm* — Larry Liberchuk

(57) ABSTRACT

In a stereoscopic display apparatus having optical directory elements such as lenticular elements (4) extending parallel to each other and being slanted at an angle to one of the rows and columns of picture elements the appearance of so called dark bands is prevented by certain combinations of the slant angle and the lens pitch.

6 Claims, 16 Drawing Sheets

STEREOSCOPIC DISPLAY APPARATUS

Figure 1:
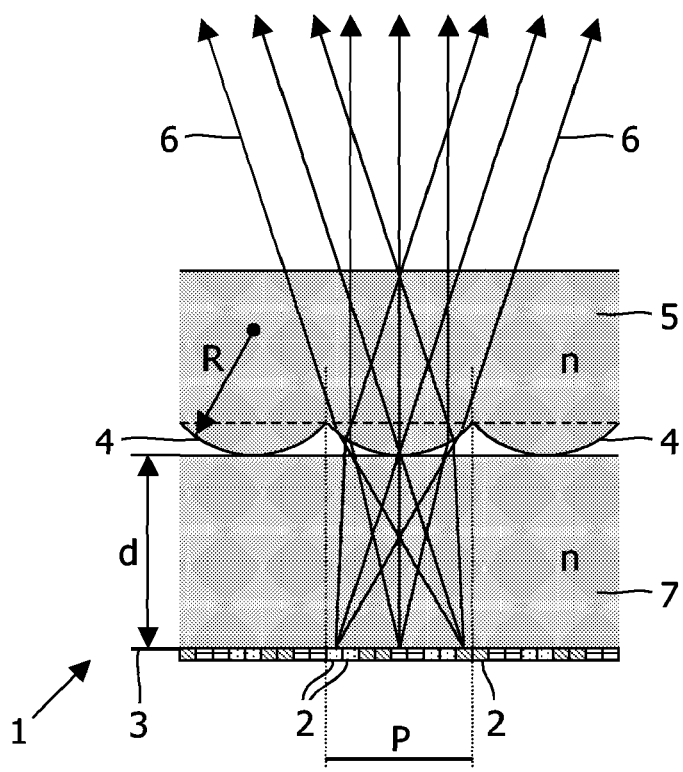

The invention relates to stereoscopic display apparatus comprising means for producing a display having laterally separated picture elements in a first plane and optical directory means comprising a group of optical directory elements each of which is associated with a group of picture elements, the picture elements being arranged in columns with a center line in a first direction, the optical directory means overlying the picture elements in the first plane for directing the outputs of the picture elements in mutually different angular directions and being slanted with respect to the first direction.

Such stereoscopic display apparatuses are increasingly used both in hand held applications like telephones and in (TV) monitors, where a multiple views are used.

The picture elements may correspond to single pixels, such as in monochrome devices, but generally (color-devices) correspond to sub-pixels of a color picture element.

A stereoscopic display apparatus of the kind mentioned above is described in U.S. Pat. No. 6,064,424, which shows an active matrix liquid crystal display panel having picture elements arranged in groups of picture elements and a lenticular screen having (cylindrical) lenticular elements, or lenticulars, as optical directory elements overlying the display panel. The light of each picture element is sent into different well-defined directions depending on the position of the picture element with respect to the lenses. In this way typically six independent views are created corresponding to six different viewing angles. A viewer receives different views in each eye and, when using the proper image content, observes a three-dimensional image.

Each lenticular in U.S. Pat. No. 6,064,424 is associated with a group of picture elements. The lenticulars are slanted with respect to the vertical column directions, which is favorable with regard to the perceived three-dimensional pixel structure.

For a viewer however due to the fact that different parts of the display reach the viewer's eye under different angles an intensity modulation on the display still occurs, referred to as "dark bands". The bands "shift" over the display as the viewer moves parallel to the display and the pitch of the bands changes as the viewer moves towards the display or away from the display. Even with a small modulation depth (e.g. only 1%) the effect is very annoying.

The present invention has as one of its objectives to overcome at least partly said intensity modulation.

To this end in a device according to the invention the central axes of the optical directory means and the center lines at their crossing at least for a part of the display define cross-sections, the positions of the cross sections at a particular center line being determined by position numbers denoting the positions relative to a first cross section at said center line in units of the picture element pitch in the first direction, each said position-number being the sum of a positive or negative integer number and a fractional position-number, having a value larger than or equal to zero and smaller than one, all cross sections at said particular center line being distributed in a number of k sets, each set having a fractional position number in the range 0, 1/k, 2/k, . . . (k−1)/k for k>1, the contribution of the different sets of fractional parts to the total number of fractional parts for said center line being substantially equal.

The invention is based on the understanding that the above mentioned modulation as a function of viewing angle, which is caused by the presence of non-emitting areas (black matrix) around the (LCD) picture elements, which are "imaged" into certain-hence darker-directions is overcome by choosing a design in which simultaneously contains both "full" (virtual) sub-pixels and "partial" (virtual) sub-pixels are imaged, leading to intensity modulations, which are mutually shifted in phase (e.g. 180° for k=2). As a result, the first harmonic of the total intensity cancels out and only a much less intense second harmonic (and third etc.) remains. The dark band effect is reduced accordingly.

To preserve the above mentioned perceived three-dimensional pixel structure the angle between the central axes of the optical directory means and the center lines preferably has a value between −45 degrees and +45 degrees.

Preferably k has a value 2, 3 or 4.

These and other aspects of the invention are apparent from and will be elucidated with reference to the embodiments described hereinafter.

Figure 2:
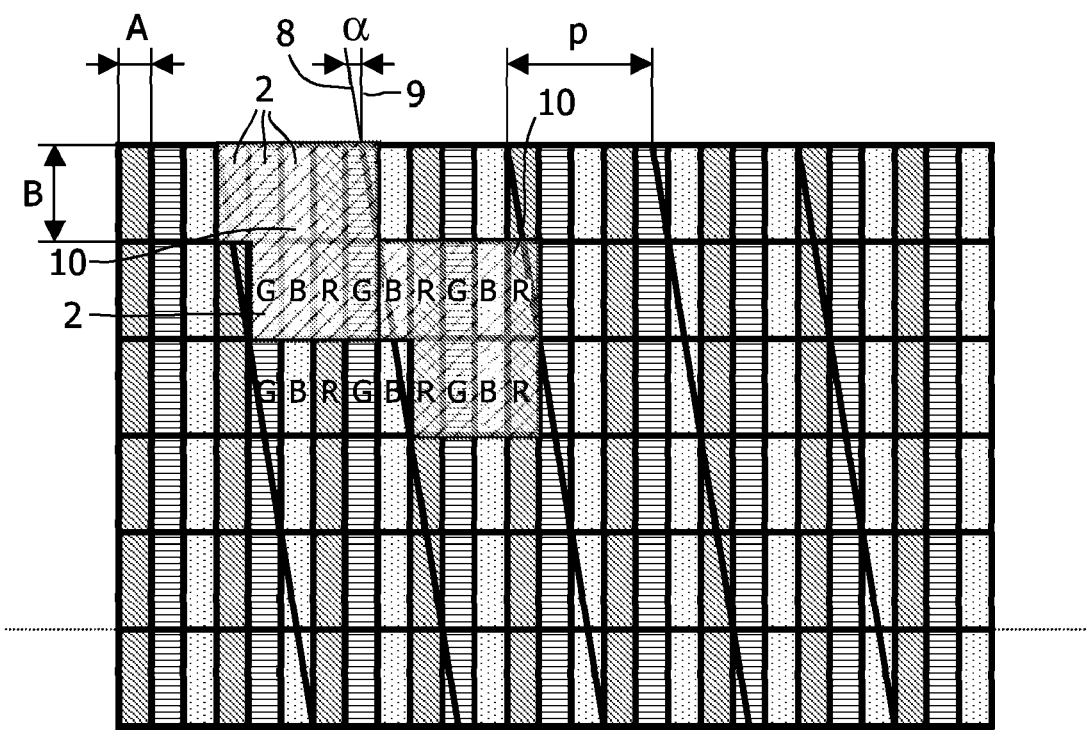
Figure 3:
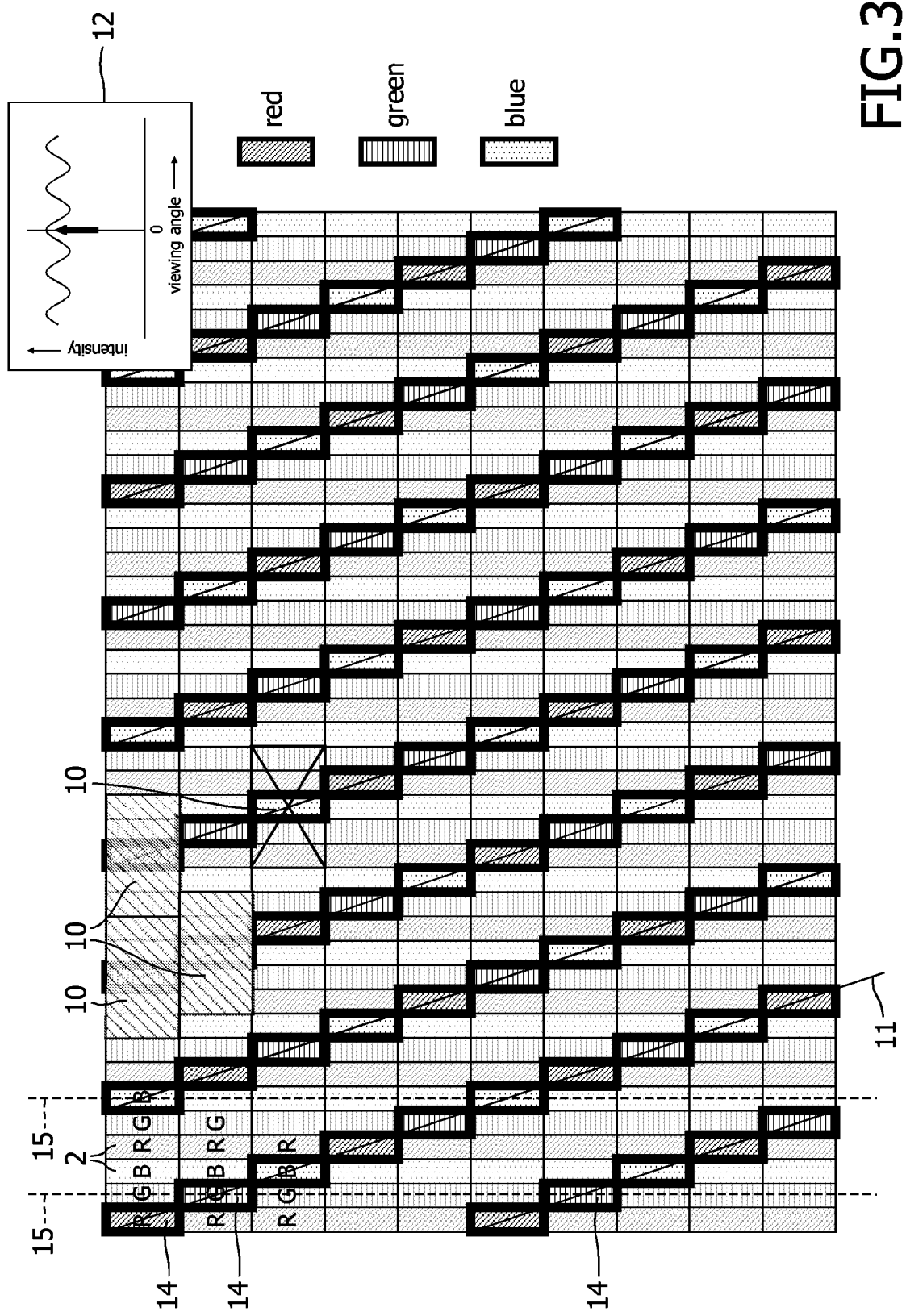
Figure 4:
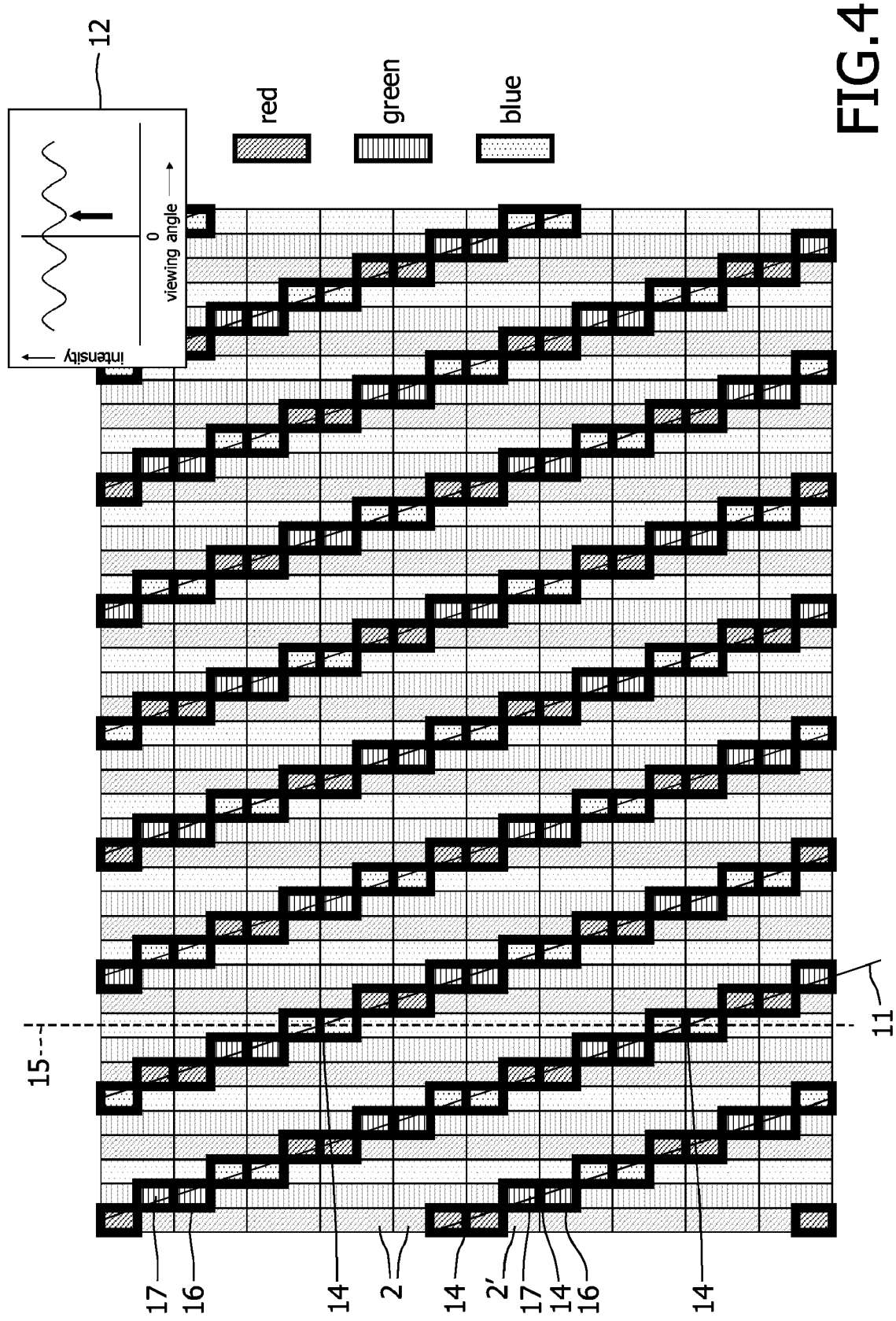
Figure 5:
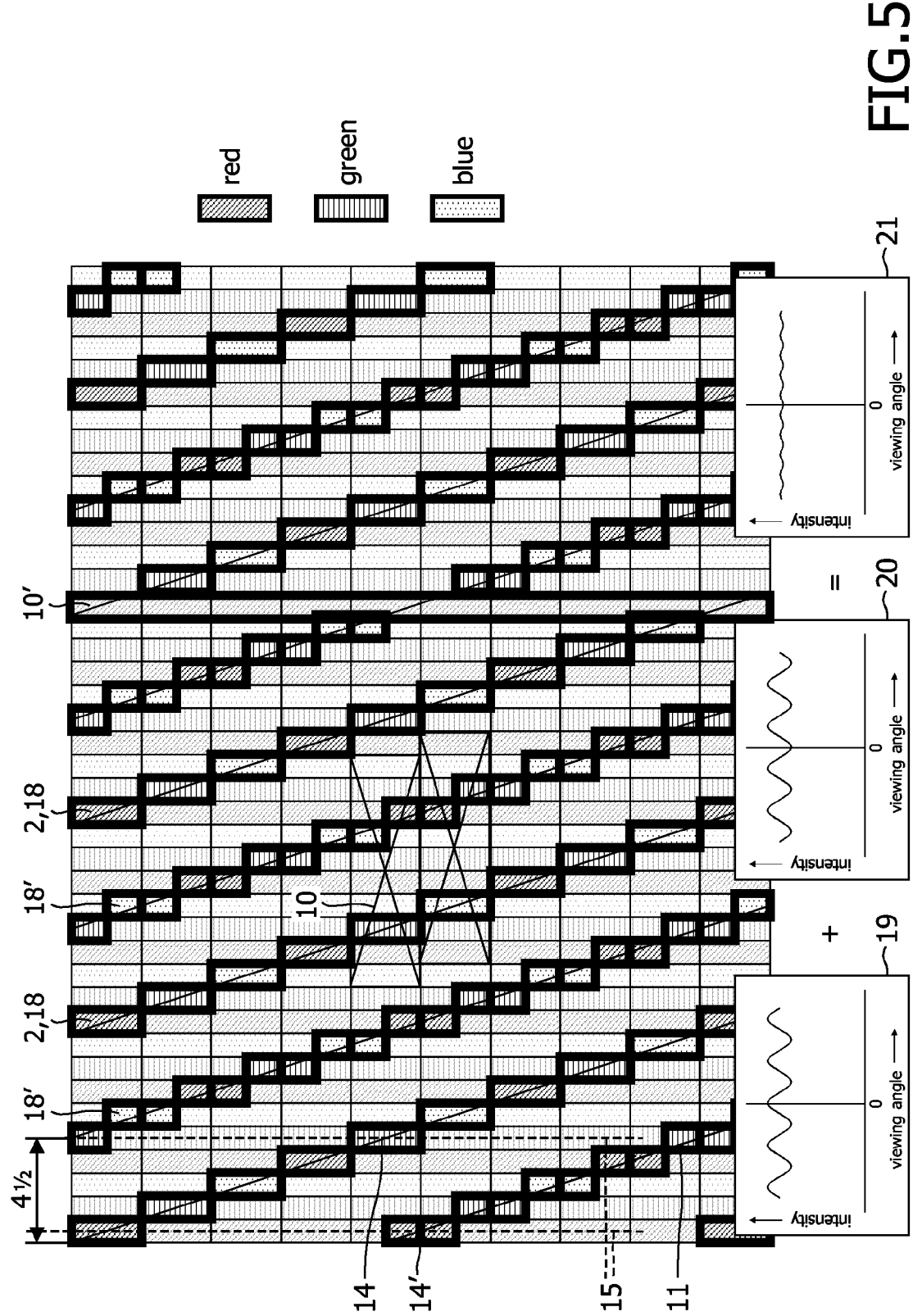
Figure 6:
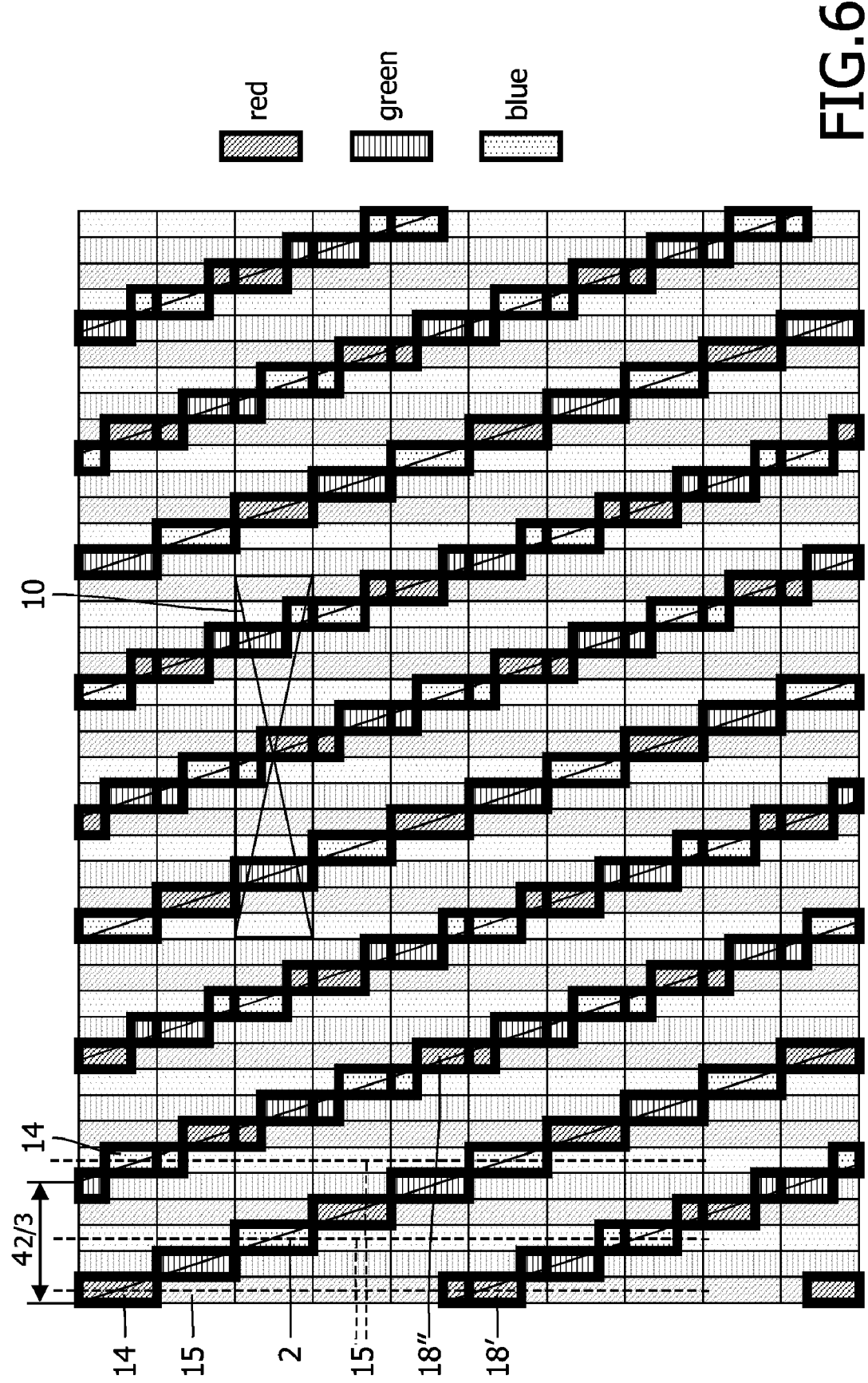
Figure 7:
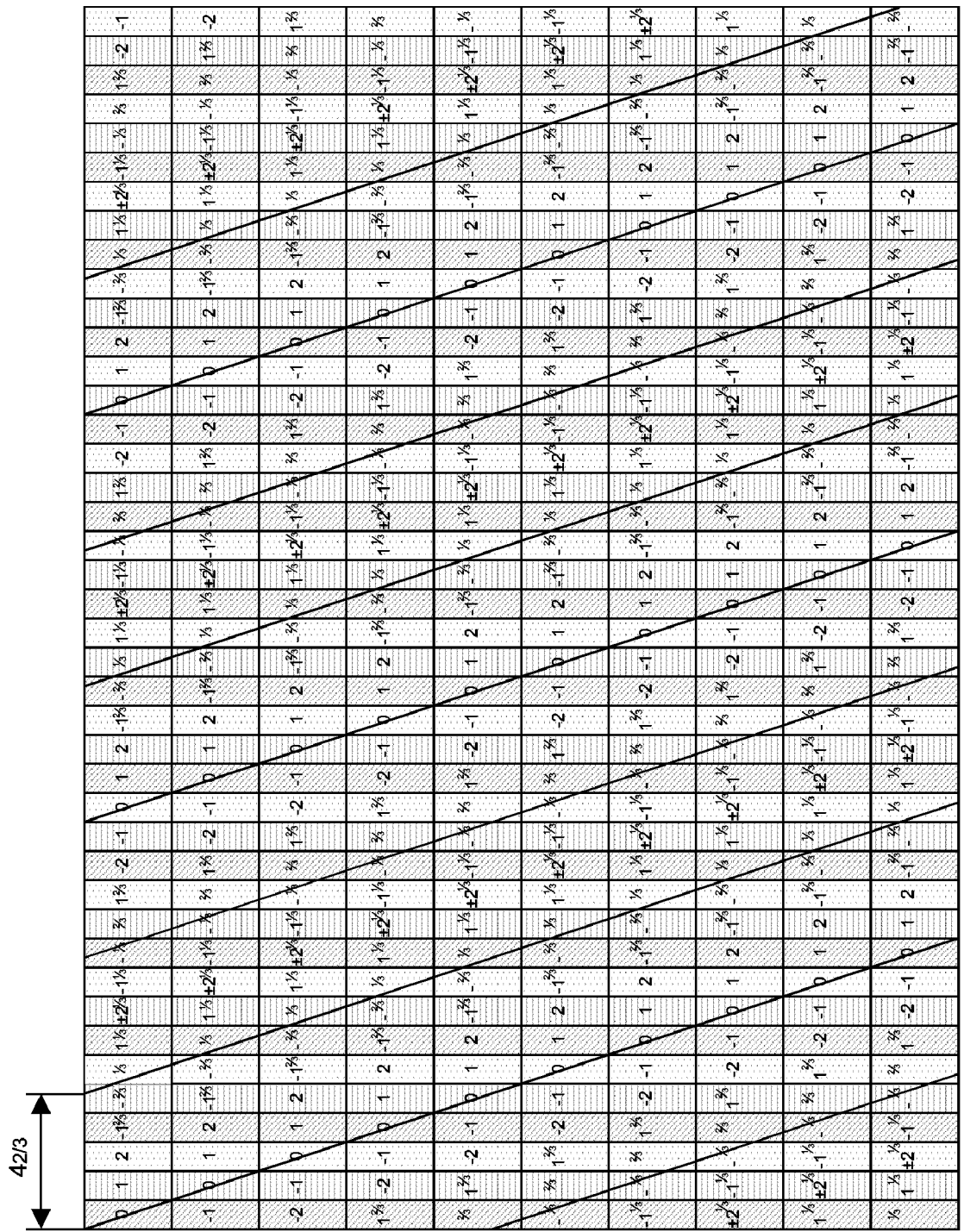
Figure 8:
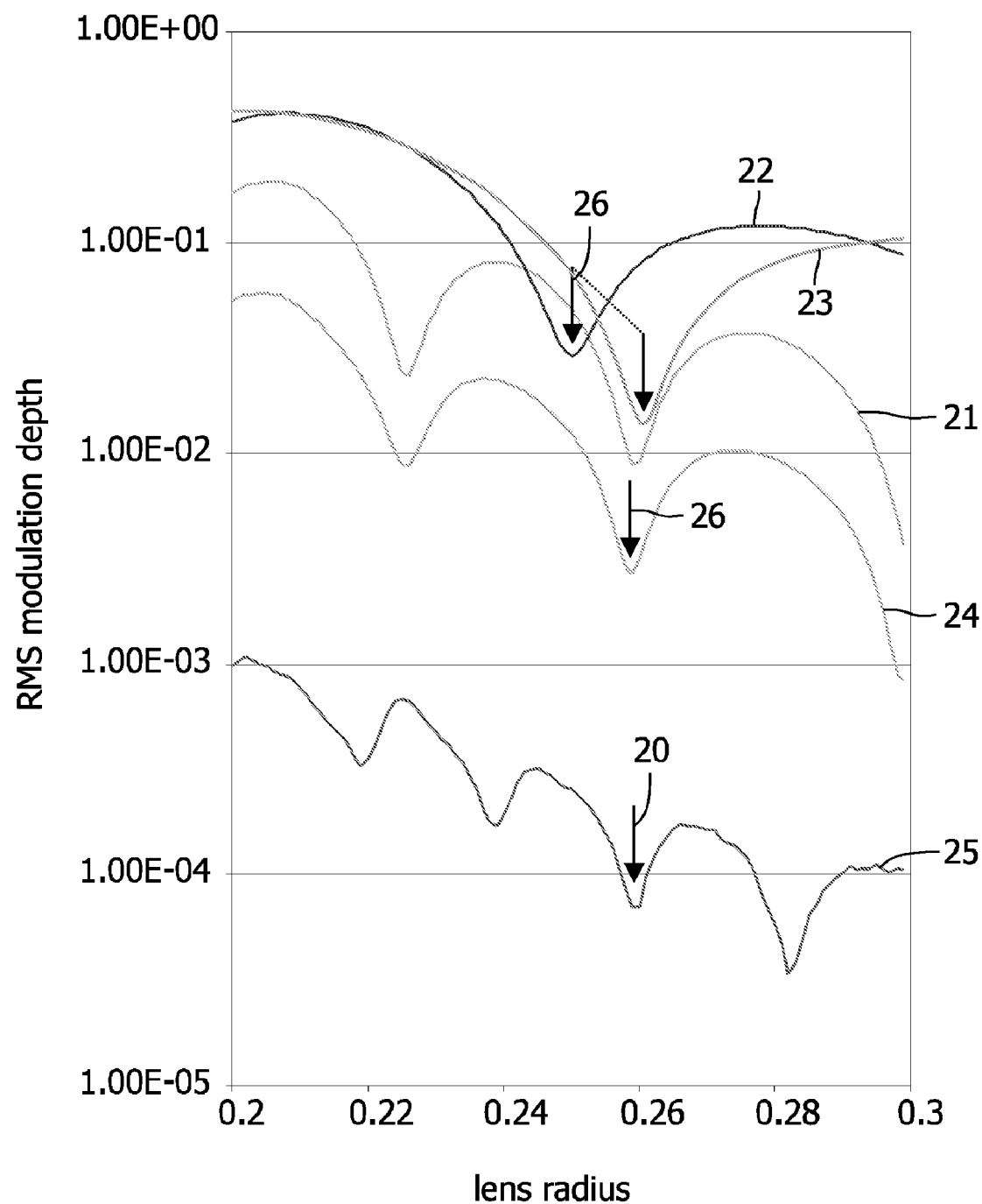
Figure 9:
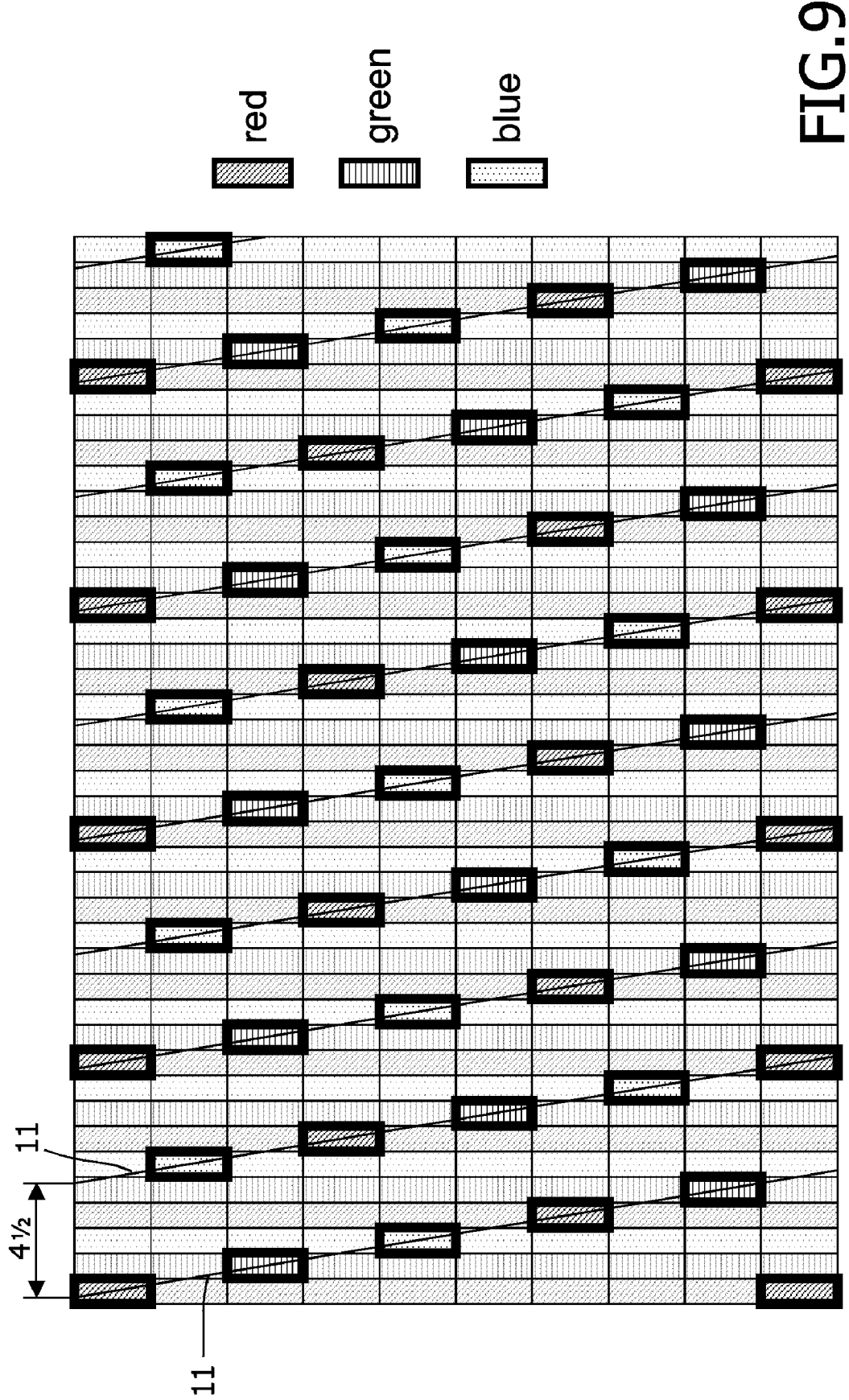
Figure 10:
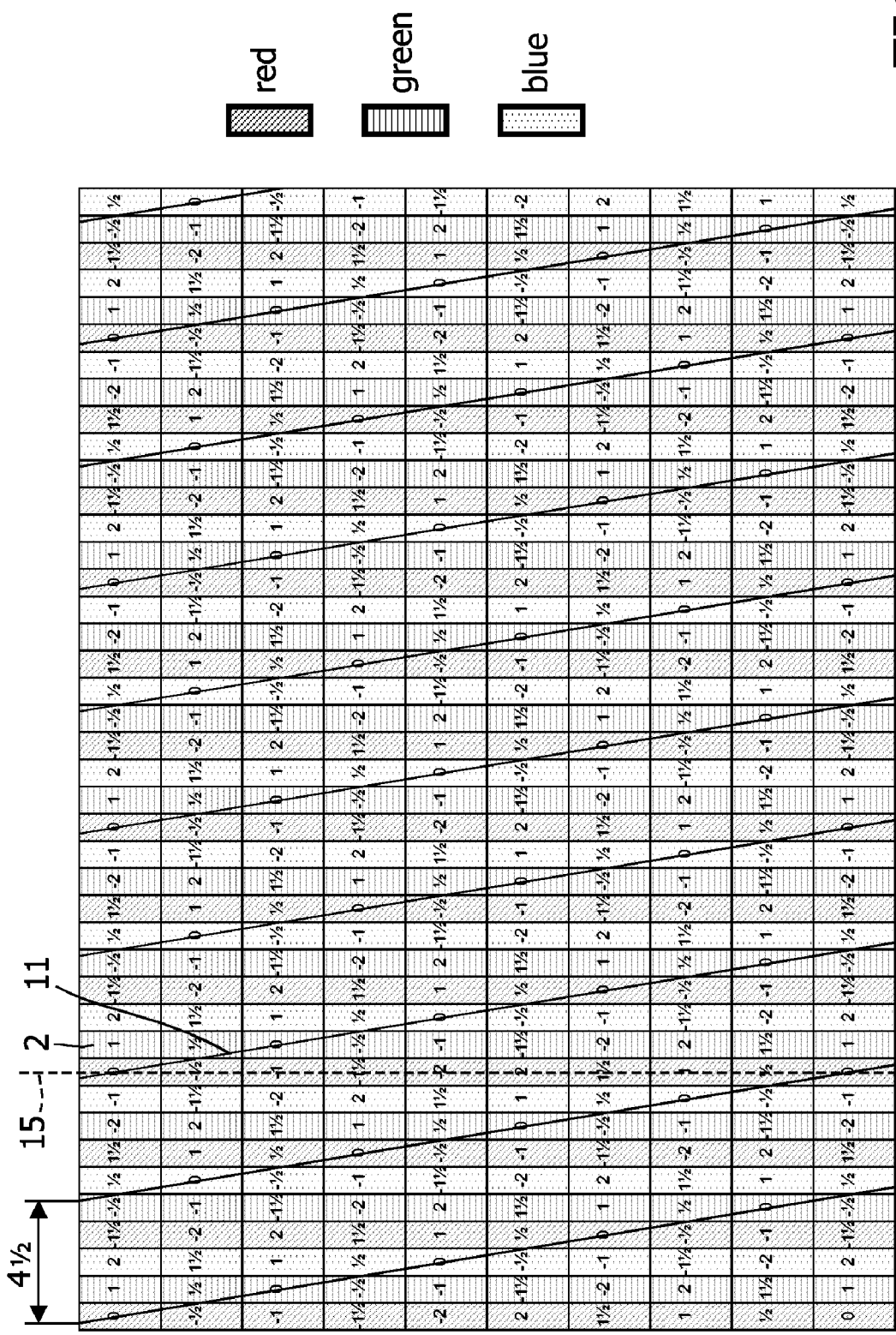
Figure 11:
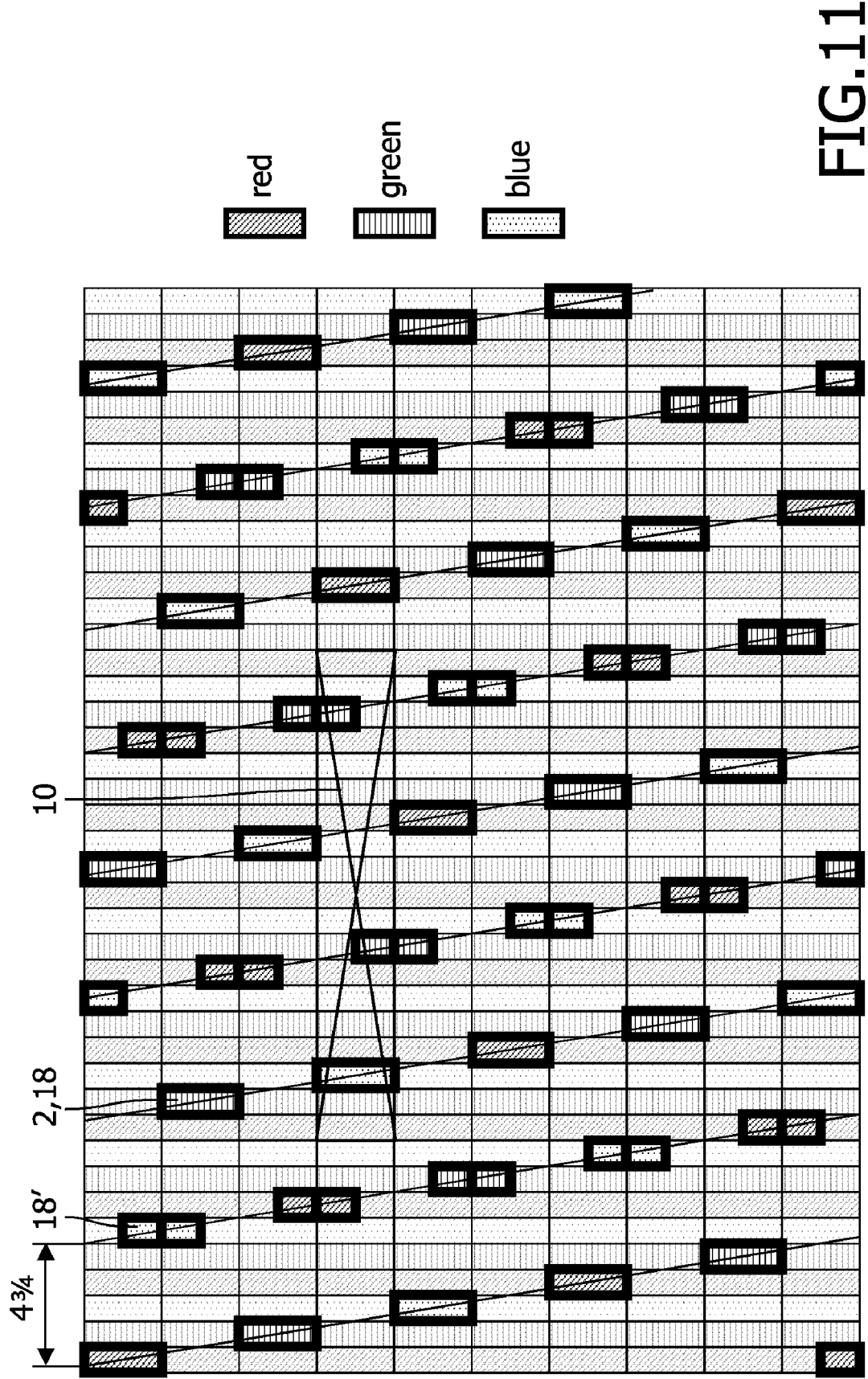
Figure 12:
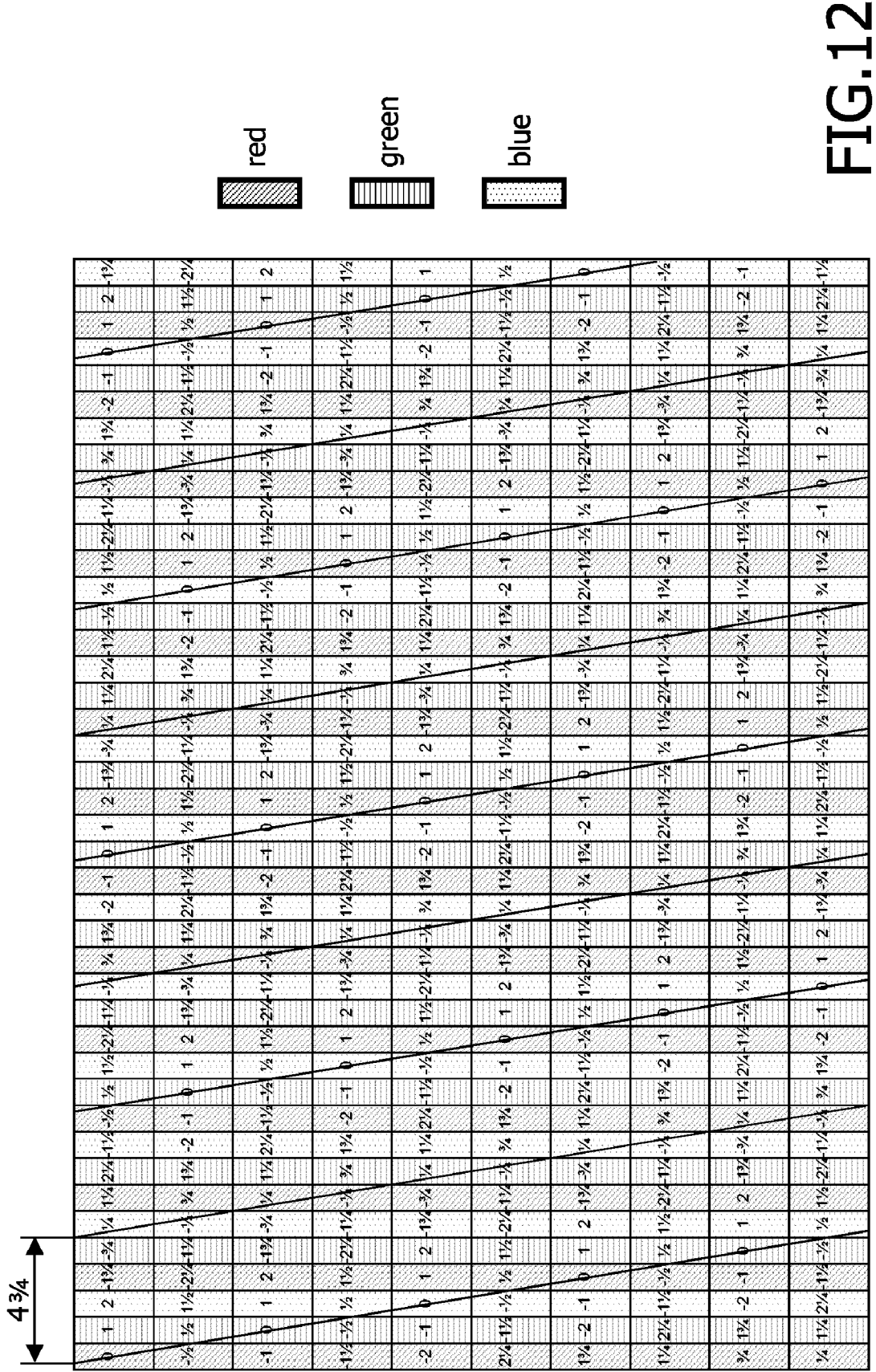
Figure 13:
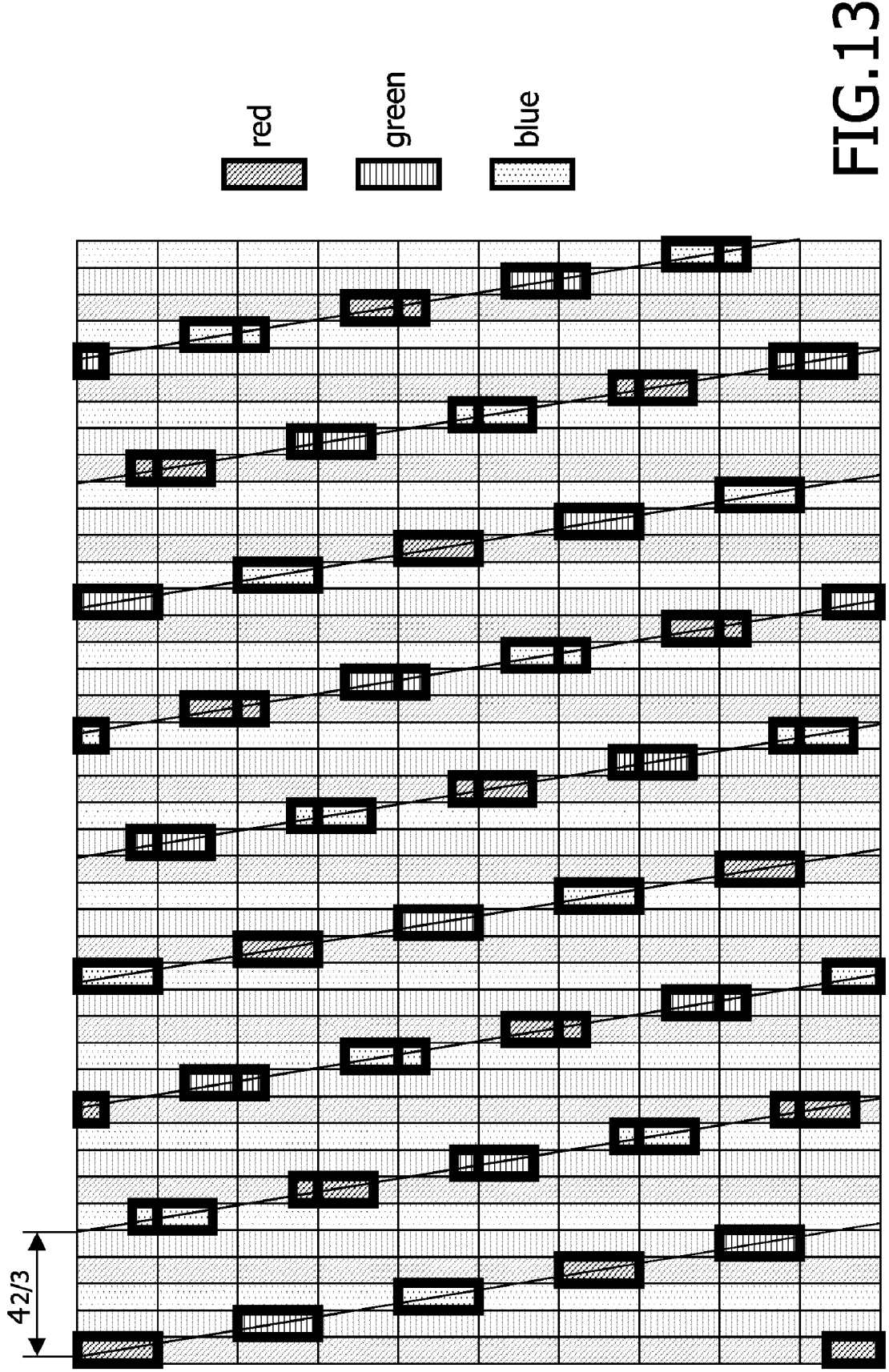
Figure 14:
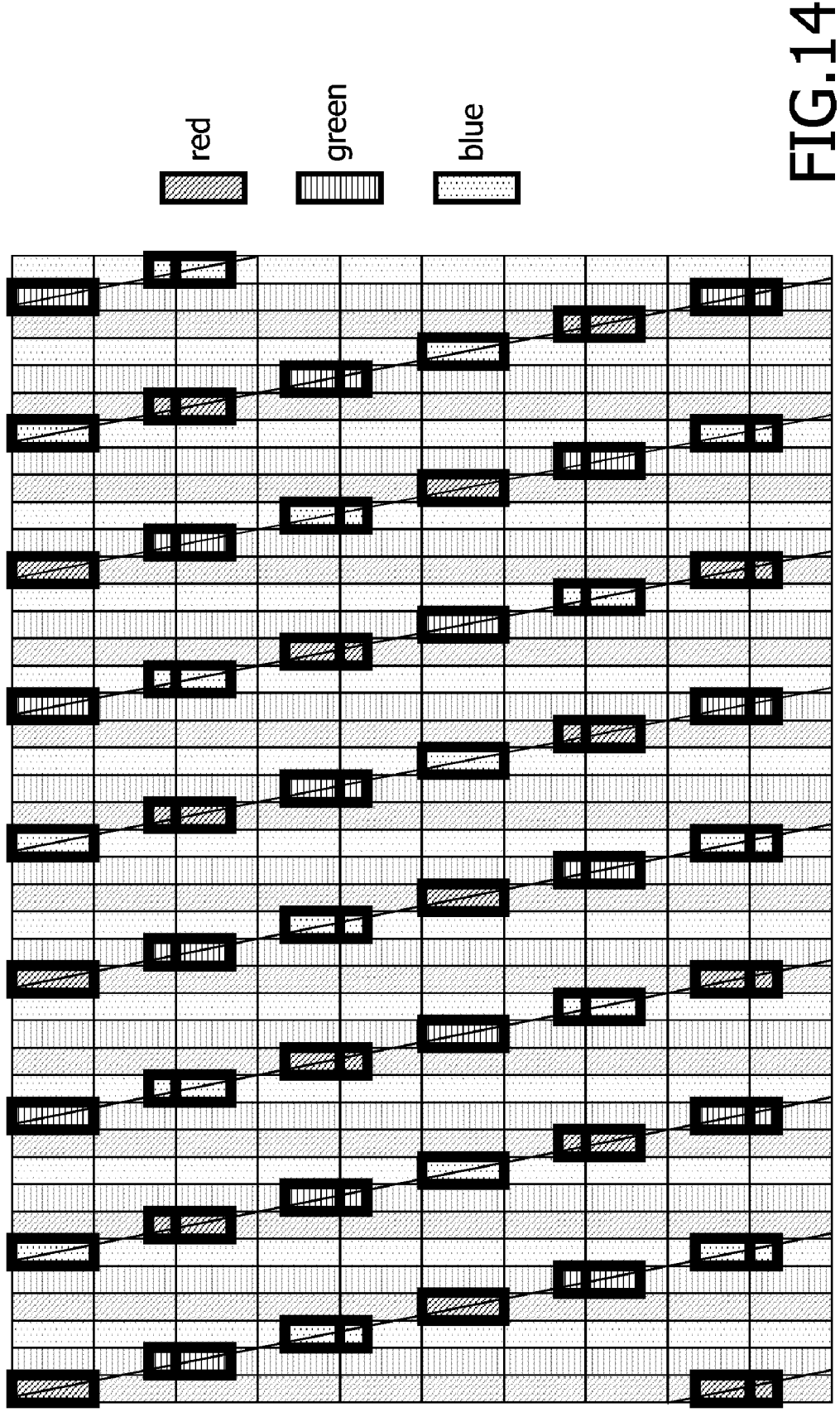
Figure 15:
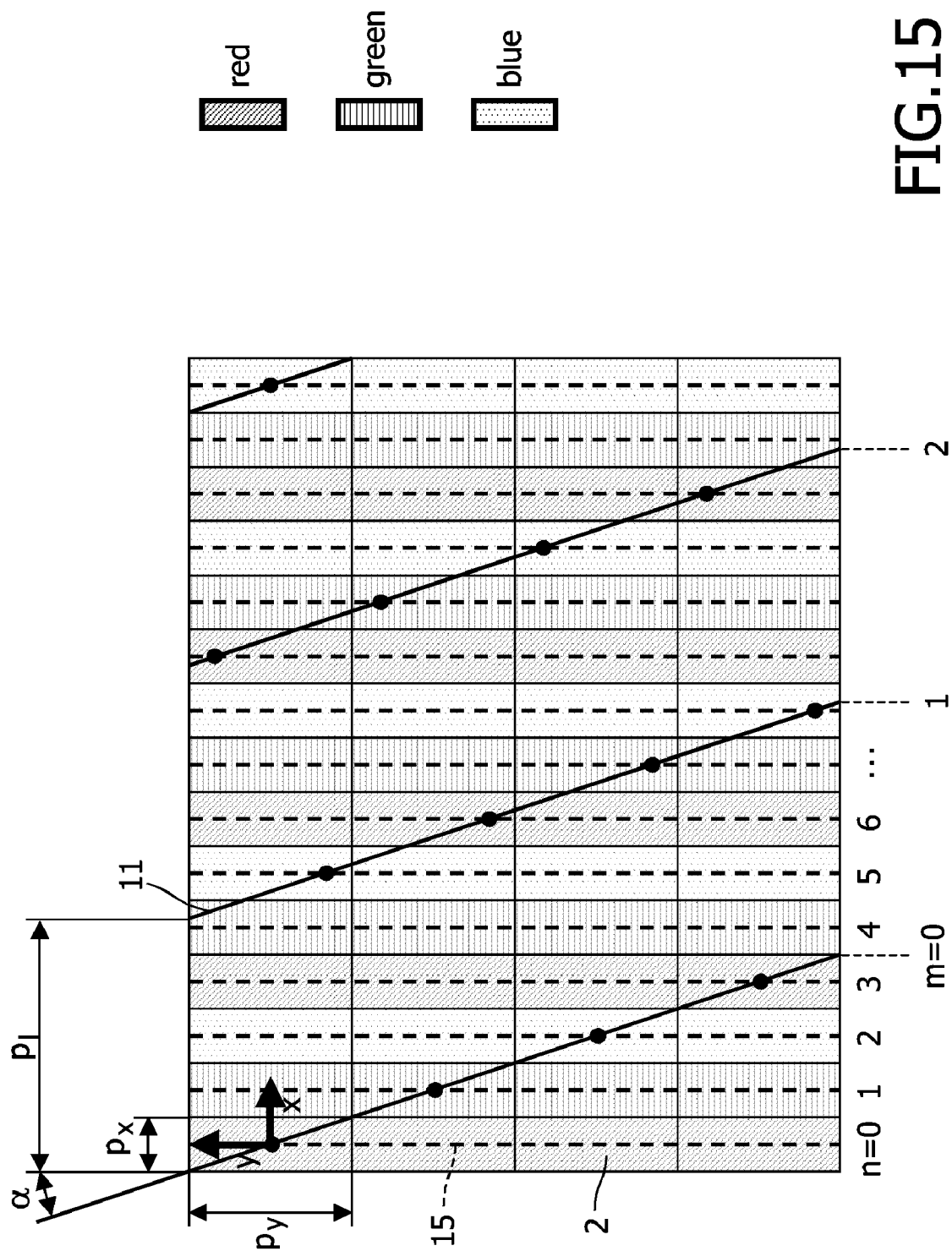
Figure 16:
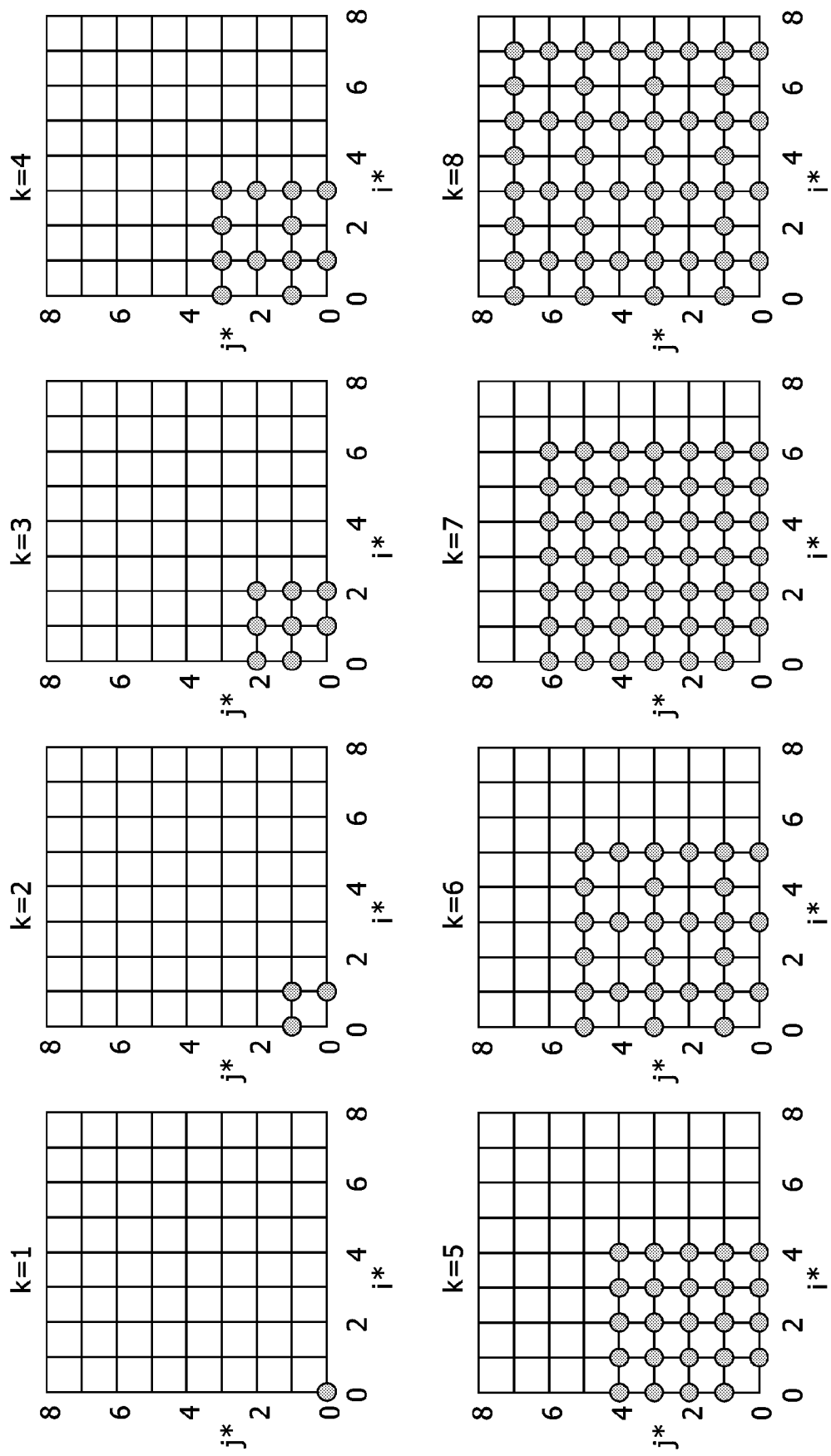
Figure 17:
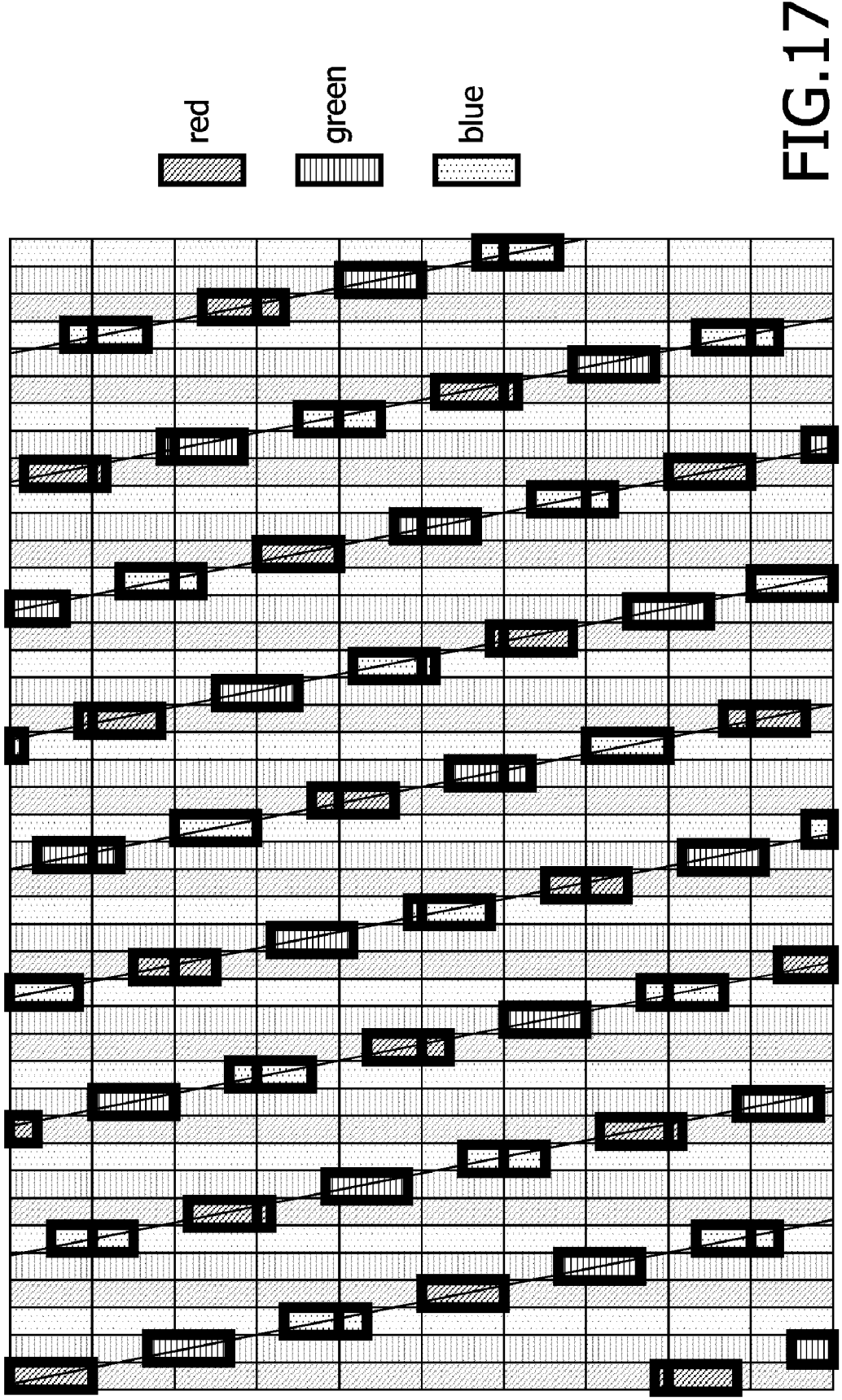

In the drawings:

FIG. 1 schematically shows a part of a device according to the invention,

FIG. 2 shows a plan view of the part of the device of FIG. 1,

FIG. 3 shows a standard lay-out of a color (liquid crystal) display for a stereoscopic display, FIG. 4 shows the projection under a certain angle with respect to the lay-outs of FIG. 3, FIG. 5 shows a 4½ views layout of a device according to the invention, FIG. 6 shows an embodiment of the invention, having a 4⅔ views layout, FIG. 7 shows a so-called view mapping of the 4⅔ views layout of FIG. 6, FIG. 8 shows the RMS modulation depth of the dark band structure as a function of the lens radius for different embodiments of the invention, FIG. 9 shows the standard 9 views layout of FIG. 1 again, FIG. 10 shows the view mapping of the 9 views layout of FIG. 9, FIG. 11 shows a further embodiment of the invention, having a 9½ views layout, FIG. 12 shows the view mapping of the 9½ views layout of FIG. 9, FIG. 13 shows an embodiment of the invention, having a 9⅓ views layout, FIG. 14 shows an embodiment of the invention, having a 5 views layout with a slant angle equal to atan(⅕), FIG. 15 shows a basic layout of a sub-pixel, while FIG. 16 shows i*,j*,k combinations for devices according to the invention and FIG. 17 shows another device according to the invention.

The Figures are diagrammatic and not to scale; corresponding components are generally denoted by the same reference numerals.

FIG. 1 shows a schematic cross-sectional view of a part of a device 1 according to the invention having a display device with laterally separated picture elements 2 in a first plane 3. The device 1 has optical directory means, in this example a group of lenses (lenticulars) 4, each of which is associated with a group of picture elements 2. The lenses 4 cover the picture elements 2 in the first plane 3 for directing the outputs of the picture elements in mutually different angular directions. In this example the lenses are provided on a separate plate 5 in front of the display, with the curved side facing the display. The angular directions are indicated by means of arrows 6. The tangent of the angle α that the axes of the lenticulars (indicated by projected lines 8) make with the vertical axis 9 is ⅙ (see FIG. 2, which shows a diagram in the direction perpendicular to the display). Hence, in this particular case α=atan(⅙), which can be positive or negative. The lenticulars are slanted to improve the perceived picture element structure. The pitch p of the lenses is essentially such that the distance between the lenses measured in the horizontal direction equals 4.5 times the sub-picture element pitch A, i.e. p=4.5*A/cos(α). This results in a 2*4.5=9 views display. Areas 10 denote repeating zones of nine sub-pixels, each attributing to nine independent views.

The index of refraction of the display front panel 7 and the index of refraction of lenses is chosen n=1.5. Furthermore, the lens bodies in this example are (parts of) cylinders.

When moving in front of the display a modulation (dark bands) is clearly visible, although the modulation depth is only in the order of 1% (rms). The modulation is caused by the fact that different positions on the display correspond to different viewing angles. These in turn correspond to slightly different intensities due to different black matrix components in the light output, caused by e.g. a black matrix in certain (liquid crystal) displays. The bands move and change their pitch as the viewer moves in front of the display.

The angular dependence of the intensity is schematically illustrated in FIGS. 3 and 4, which show lay-outs of such a color (liquid crystal) display. In this case the slant angle α between a vertical direction, indicated by centerlines (striped lines) 15 and slanted lines 11 is atan(⅓) and the number of views is 5. The slanted lines 11 denote the projection of the axes in the direction perpendicular to the display.

The "bold" sub-pixels 2 are imaged towards the viewer. Areas 10 denote repeating zones of five sub-pixels, now each attributing to five independent views. It is noted that that the actual pixel shape perceived by the viewer generally occupies the full lens width. It is also noted that the central axes of the optical directory means (defined by the projection lines 11) and the centerlines 15 have their crossings 14 always at the center of a sub-pixel 2. The insert 12 shows the intensity distribution as a function of the viewing angle.

FIG. 4 shows the projection of the lens axes under a certain angle with respect to the normal. Now the lens axes intersect the sub-pixels "halfway". The bold rectangles 17 can be regarded as a sort of "partial" (virtual) sub-pixels, but in fact consist of a lower half and an upper half of two separate original sub-pixels 2, 2'. The black matrix, indicated by line 16 in rectangular 17 is now located in the middle of said (virtual) sub-pixel, resulting in a different light intensity distribution as a function of the viewing angle, see the insert 12 of FIG. 4. It is noted that the projection lines 11 and the centerlines 15 have their crossings 14 always at the same places again, be it now at the center of the bottom of a sub-pixel 2.

This effect of dark bands can be minimized partly by a proper design of the lens curvature, but it cannot be fully eliminated. It becomes more disturbing if the relative amount of black matrix increases, such as in small displays. An additional problem may occur due to chromatic dispersion. If the modulation depth depends on the color, this enhances the problem of elimination for all colors simultaneously.

A device according to the invention is shown in FIG. 5, in which an unusual combination of the slant angle and the lens pitch is chosen such that, when viewed from one certain direction, several types of virtual sub-pixels are simultaneously imaged towards the viewer.

FIG. 5 shows a 4½ views layout in which the pixel mapping of a pixel view simultaneously contains both "full" (virtual) sub-pixels 2, 18 and "halfway" (virtual) sub-pixels 18'. The "full" (virtual) sub-pixels 2 and "halfway" (virtual) sub-pixels 18' give intensity modulations, which are mutually shifted 180° in phase, indicated by inserts 19 and 20, showing the different light intensity distribution as a function of the viewing angle for both kind of (virtual) pixels. As a result, the first harmonic of the total intensity cancels out and only a much less intense second harmonic (and third etc.) remains indicated by insert 21. The dark band effect is reduced accordingly. Areas 10 denote repeating zones of nine sub-pixels, now each attributing to nine independent views. It is noted that the projection lines 11 and the centerlines 15 have their crossings always at different places, viz crossings 14 always at the center of a sub-pixel 2, 18 and crossings 14' always at the center of the bottom of a sub-pixel 2, 18. The numbers of crossings 14 and crossings 14' are substantially equal for a certain display area.

FIG. 6 shows an embodiment of the invention, having a 4⅔ views layout in which the pixel mapping of a pixel view simultaneously contains three different types of virtual sub-pixels, viz. "full" (virtual) sub-pixels 2, 18, "⅓ halfway" (virtual) sub-pixels 18' and "⅔ halfway" (virtual) sub-pixels 18". Areas 10 now denote repeating zones of fourteen sub-pixels, now each attributing to fourteen independent views. In this case not only the first harmonic, but also the second harmonic cancels out in the total intensity. Generally, larger denominators result in the cancellation of correspondingly larger harmonics, but also to a larger "wavelength" of the column-to-column modulation. A too long wavelength may result in visible structures, which is preferably avoided, so preferably the denominator is kept below 5 or 6. It is noted that the projection lines 11 and the centerlines 15 have their crossings always at different places, viz crossings 14 always at the center of a sub-pixel 2, 18 and crossings 14' always at the center of a sub-pixel 2, 18 at ⅓ of the height of a sub-pixel and crossings 14" always at the center of a sub-pixel 2, 18 at ⅔ of the height of a sub-pixel. The numbers of crossings 14 and crossings 14' is substantially equal for a certain display area.

FIG. 7 shows a so-called view mapping of the 4⅔ views layout of FIG. 6. The numbers in the sub-pixels correspond to the horizontal distance from the center of the sub-pixel to nearest lens axis (slanted projection line as shown in the figures), measured in units of horizontal sub-pixel pitch. These numbers are a measure for the emission angle of the corresponding view. For views close to the display normal these numbers are roughly proportional to the emission angle. The 4⅔ views in this layout in fact corresponds to 3×4⅔=14 different views or viewing angles.

FIG. 8 shows the RMS modulation depth of the dark band structure as a function of the lens radius for a mobile display application. Curve 21 serves as a reference and corresponds to a standard 9 views layout with a slant angle of atan(⅙) as shown in FIGS. 1,2. The curves 22 and 23 correspond to 5 and 4 views respectively, with a slant angle of atan(⅓). In practice the lens radius is usually chosen to correspond to a minimum in the RMS curve, indicated by the arrows. In this case the radius would be chosen somewhere between/around 250 and 260 μm.

The fourth and fifth curves (curves 24 and 25, respectively) correspond to 4½ and 4⅔ views respectively, with a slant angle of atan(⅓). The RMS modulation depth drops one order of magnitude when going from the 5 view minimum to the 4½ view minimum. The 4⅔ views minimum is even two to three orders magnitude lower when compared to the 5 views minimum. In the case of 4⅔ views the dark band modulation is very low, irrespective of the lens radius.

FIG. 9 shows the standard 9 views layout of FIG. 1 with a slant angle of atan(⅙). The horizontal distance between two projection lines 11 corresponds to 4½ horizontal sub-pixel pitch. Only one type of (virtual) sub-pixel is present represented by the bold sub-pixels. This system accounts for relatively good band modulation properties of a standard nine views system, as shown in FIG. 8.

FIG. 10 shows the view mapping of the nine views layout. The projection lines 11 and the centerlines 15 have their crossings 14 always at the same places again, be it now at the center of a sub-pixel 2.

FIG. 11 shows a further embodiment of the invention, having a 9½ views layout in which the pixel mapping of a pixel view simultaneously contains both "full" (virtual) sub-pixels 2 and "halfway" (virtual) sub-pixels 18. The corresponding view mapping is shown in FIG. 12. The total number of independent views now is 2×9½=19.

FIG. 13 shows an embodiment of the invention of the invention, having a 9⅓ views layout in which the pixel mapping of a pixel view simultaneously contains three types of virtual sub-pixels, similar to the 4⅔ views layout as shown in FIG. 6. The number of independent views is 3×9⅓=28.

In the examples shown, fractional views have been obtained by varying the lens pitch with respect to the horizontal sub-pixel pitch. The intensity modulation is also reduced by varying the slant angle and use a slant angle which (for a three-color display) differs from the usual values atan(⅓), atan(⅙). As an example FIG. 14 shows an embodiment of the invention of the invention, having a 5 views layout with a slant angle equal to atan(⅕). This layout contains the "full", "⅓ halfway" and "⅔ halfway" virtual sub-pixels. It has a performance similar to the 4⅔ views layout as shown in FIG. 6.

So more generally, fractional views can be obtained by combining a certain lens pitch with a certain slant angle. To derive which combinations give the desired result a basic layout of a sub-pixel is given in FIG. 15. The slanted lines 11 denote the lens axes projected onto the pixel structure. The vertical dashed lines 15 denote the centers of the columns. $p_x$, $p_y$ and $p_l$ are the pitch of the sub-pixels in the x-direction, the pitch of the sub-pixels in the y-direction and the pitch of the lenticulars in the x-direction respectively. The indices n and m are associated with the columns and the lenses respectively. The intersections of the lens axes with the dashed lines are indicated with dots. The origin of the coordinate frame is located at one arbitrarily chosen intersection point, the corresponding column axis and lens axis being indicated by n=0 and m=0, respectively.

It is recognized (and already shown above), that cancellation of intensity harmonics is determined by the distribution of the vertical position of the black dots relative to the center of the sub-pixels. This position is characterized by the "fractional part" of $y/p_y$.

For a cancellation of intensity harmonics it is required that the relative y-positions can be distributed into a number of k (k=1, 2, 3, 4, . . . ) classes, each class being characterized by a unique fractional part of $y/p_y$ from the range 0, 1/k, 2/k, . . . , (k−1)/k, and all classes being equally occupied.

If the normalized slant-slope, a, and the normalized lens pitch, b, are defined by:

$$a = \frac{p_x}{p_y \tan(\alpha)}, \quad b = \frac{p_l}{p_x}. \quad (1a, b)$$

A slant angle of atan(⅓) corresponds to a=1 and an angle of atan(⅙) corresponds to a=2. The position y of the intersection of column n with lens axis m is given by:

$$\frac{y}{p_y} = a(n - mb). \quad (2)$$

The right hand term should be a number with a fractional part 0, 1/k, 2/k, . . . , (k−1)/k.

Hence, $$ka(n-mb) \bmod k = 0, 1, 2, \ldots, k-1. \quad (3)$$

Since this must hold for any n, m, it follows that ka and kab must both be integers:

$$ka = i \text{ and } kab = j, \text{ with } i, j = \ldots -2, -1, 0, 1, 2, \ldots \quad (4a,b,c)$$

Hence, $$a = \frac{i}{k} \text{ and } b = \frac{j}{i}. \quad (5a, b)$$

The integers i and j cannot be chosen arbitrarily, since all fractional parts must be populated (in equal amounts). It is convenient to write i and j as:

$$i = i^* + M_i k, \quad j = j^* + M_j k, \quad (6a,b)$$

with $$i^*, j^* = 0, 1, 2, \ldots, k-1, M_i, M_j = \ldots, -2, -1, 0, 1, 2, \ldots \quad (6c,d)$$

Now, a necessary and sufficient condition to fulfill equation (3) is that a combination n,m= . . . −2, −1, 0, 1, 2, . . . exists such that:

$$(i^*n + j^*m) \bmod k = 1. \quad (7)$$

FIG. 16 shows the i*,j*,k combinations satisfying this criterion for k=1.8.

The expressions for the normalized slant slope a and lens pitch b become:

$$a = \frac{i^*}{k} + M_i, \quad b = \frac{\frac{j^*}{k} + M_j}{\frac{i^*}{k} + M_i}. \quad (8a, b)$$

The table below shows the numbers associated with the examples shown.

| Layout | FIG. # | k | i* | $M_i$ | j* | $M_j$ | a | b |
|---|---|---|---|---|---|---|---|---|
| "5 views" | FIG. 3 | 1 | 0 | 1 | 0 | 5 | 1 | 5 |
| "4½ views" | FIG. 5 | 2 | 0 | 1 | 1 | 4 | 1 | 4½ |
| "4⅔ views" | FIG. 6 | 3 | 0 | 1 | 2 | 4 | 1 | 4⅔ |
| "9 views" | FIG. 9 | 1 | 0 | 2 | 0 | 9 | 2 | 4½ |
| "9½ views" | FIG. 11 | 2 | 0 | 2 | 1 | 9 | 2 | 4¾ |
| "9⅓ views" | FIG. 13 | 3 | 0 | 2 | 1 | 9 | 2 | 4⅔ |
| "5 views, ⅕" | FIG. 14 | 3 | 2 | 1 | 1 | 8 | ⅔ | 5 |
| "4⁷⁄₁₀ views, ⅕" | FIG. 17 | 6 | 4 | 1 | 5 | 7 | ⅔ | 4⁷⁄₁₀ |

FIG. 17 has been added as an example of a more elaborated embodiment.

The term "fractional views" has been attributed to cases where k>1. In this sense, the "5 views" and "9 views" layout are not fractional. There is in fact a subtle difference about a fractional views layout and the occurrence of non-integer values of the ratio "view-numbers/viewing-angles." In the examples having "9 views" layout both integer and half-integer view-numbers/viewing angles appear, be it now in correspondence to the horizontal distances to the lens axes. As mentioned before, in a layout according to the invention, a substantially equal distribution of the vertical positions of the intersections of the column centerlines 15 with the projected lens axes 11 over different k-values leads to a cancellation of intensity harmonics.

Although in the examples a liquid crystal display is shown, the invention can also be used in other kinds of displays such as foil-displays LED-displays etcetera.

Instead of lenticular elements other directory elements such as grids may be chosen alternatively.

The invention resides in each and every novel characteristic feature and each and every combination of features. Reference numerals in the claims do not limit the protective scope of these claims. The use of the verb "to comprise" and its conjugations does not exclude the presence of elements other than those stated in the claims. The use of the article "a" or "an" preceding an element does not exclude the presence of a plurality of such elements.

The invention claimed is:

1. A stereoscopic display apparatus comprising
    means for producing a display having laterally separated picture elements in a first plane and
    optical directory means comprising a group of optical directory elements each of which is associated with a group of picture elements,
    the picture elements being arranged in columns with a center line in a first direction,
    the optical directory means overlying the picture elements in the first plane for directing the outputs of the picture elements in mutually different angular directions and being slanted with respect to the first direction,
    central axes of the optical directory elements and the center lines at their crossing at least for a part of the display defining intersections, the positions of the intersections at a particular center line being determined by position-numbers denoting the positions relative to a first intersection at said center line in units of a pitch of the picture elements in the first direction,
    each said position-number being the sum of a positive or negative integer number and a fractional position-number, having a value larger than or equal to zero and smaller than one, and
    all intersections along said particular center line are distributed in a number of k sets, each set having a unique fractional position number in the range 0, 1/k, 2/k, ... (k−1)/k for k>0, the contribution of the different sets to the total number of position-numbers for said center line being substantially equal, such that the relative positions of the intersections in the first direction are distributed into the number k of sets, each set characterized by the same fractional part, and all sets being equally occupied.

2. A stereoscopic display apparatus as claimed in claim 1, the columns corresponding to display columns and the angle between the central axes of the optical directory means and the center lines having a value between −45 degrees and +45 degrees.

3. A stereoscopic color display apparatus as claimed in claim 1 in which the picture elements correspond to sub-pixels of a full color picture element.

4. A stereoscopic display apparatus as claimed in claim 1 in which k=2.

5. A stereoscopic display apparatus as claimed in claim 1 in which k=3.

6. A stereoscopic display apparatus as claimed in claim 1 in which k=4.

* * * * *